US 9,755,935 B2

(12) United States Patent
Meng et al.

(10) Patent No.: US 9,755,935 B2
(45) Date of Patent: Sep. 5, 2017

(54) METHOD, SYSTEM AND COMPUTER STORAGE MEDIUM FOR BANDWIDTH OPTIMIZATION OF NETWORK APPLICATION

(71) Applicant: Tencent Technology (Shenzhen) Company Limited, Shenzhen (CN)

(72) Inventors: Qiyuan Meng, Shenzhen (CN); Zhao Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 406 days.

(21) Appl. No.: 14/169,304

(22) Filed: Jan. 31, 2014

(65) Prior Publication Data
US 2014/0215061 A1 Jul. 31, 2014

Related U.S. Application Data

(63) Continuation of application No. PCT/CN2012/078310, filed on Jul. 6, 2012.

(30) Foreign Application Priority Data

Aug. 2, 2011 (CN) .......................... 2011 1 0219881

(51) Int. Cl.
*G06F 15/173* (2006.01)
*H04L 12/26* (2006.01)
(Continued)

(52) U.S. Cl.
CPC ...... *H04L 43/0882* (2013.01); *H04L 41/0896* (2013.01); *H04L 47/2441* (2013.01); *H04L 47/2475* (2013.01); *H04L 67/322* (2013.01)

(58) Field of Classification Search
CPC ............. H04L 41/0213; H04L 41/0896; H04L 43/0882; H04L 41/0803; H04L 63/1408
See application file for complete search history.

(56) References Cited

U.S. PATENT DOCUMENTS 6,876,668 B1 * 4/2005 Chawla ............... H04L 12/5693
370/230
7,493,407 B2 * 2/2009 Leedom .............. H04L 12/5695
709/224
(Continued)

FOREIGN PATENT DOCUMENTS

CN 1643860 A 7/2005
CN 1741467 A 3/2006
(Continued)

OTHER PUBLICATIONS

Search Report for Chinese Application No. 201110219881.2 dated Jun. 20, 2013.
(Continued)

Primary Examiner — Liangche A Wang
Assistant Examiner — Ayele Woldemariam
(74) Attorney, Agent, or Firm — Tim Tingkang Xia, Esq.; Locke Lord LLP

(57) ABSTRACT

A method for bandwidth optimization of network application is disclosed. The method includes the steps of: classifying and identifying running network applications according to a set profile, and obtaining network applications of a first category; estimating the bandwidth of the running network applications, and obtaining an available bandwidth of network applications of the first category; obtaining bandwidth occupied by network applications of the first category, and determining whether the bandwidth occupied by network applications of the first category is higher than the available bandwidth; and if yes, then adjusting the bandwidth occupied by network applications of the first (Continued)

category. By the above method, system and computer-readable storage medium for bandwidth optimization, the possibility of network congestion is reduced, and the network fluency of the network applications of the system is improved.

10 Claims, 9 Drawing Sheets

(51) Int. Cl.
  *H04L 12/859* (2013.01)
  *H04L 12/851* (2013.01)
  *H04L 29/08* (2006.01)
  *H04L 12/24* (2006.01)

(56) References Cited

U.S. PATENT DOCUMENTS

| | | | | |
|---|---|---|---|---|
| 8,909,759 | B2* | 12/2014 | Fiatal | H04L 43/0882 |
| | | | | 709/224 |
| 9,008,673 | B1* | 4/2015 | Sanjeev | H04L 43/16 |
| | | | | 709/224 |
| 2004/0257994 | A1* | 12/2004 | Paskett | H04L 12/5695 |
| | | | | 709/238 |
| 2005/0100000 | A1 | 5/2005 | Faulkner et al. | |
| 2005/0276263 | A1* | 12/2005 | Suetsugu | H04L 45/24 |
| | | | | 370/389 |
| 2010/0023623 | A1* | 1/2010 | Saffre | H04L 12/5695 |
| | | | | 709/226 |
| 2010/0121964 | A1* | 5/2010 | Rowles | H04L 47/10 |
| | | | | 709/229 |

FOREIGN PATENT DOCUMENTS

| | | |
|---|---|---|
| CN | 101257454 A | 9/2008 |
| CN | 102025623 A | 4/2011 |
| CN | 102137160 A | 7/2011 |
| WO | 2010039023 A2 | 4/2010 |

OTHER PUBLICATIONS

Chinese Office Action for Application No. 201110219881.2 dated Jul. 2, 2013.
International Search Report for Application No. PCT/CN2012/078310 dated Oct. 4, 2012.

* cited by examiner

METHOD, SYSTEM AND COMPUTER STORAGE MEDIUM FOR BANDWIDTH OPTIMIZATION OF NETWORK APPLICATION

CROSS-REFERENCES TO RELATED APPLICATIONS

This application is a continuation application of International Application No. PCT/CN2012/078310, filed Jul. 6, 2012, entitled "BANDWIDTH OPTIMIZATION METHOD AND SYSTEM IN NETWORK APPLICATIONS AND COMPUTER STORAGE MEDIUM", by Qiyuan MENG and Zhao LIU, which claims priority from Chinese patent application No. CN201110219881.2, filed on Aug. 2, 2011, the disclosures for which are herein incorporated by reference in their entireties.

FIELD OF THE INVENTION

The present invention relates generally to the field of Internet technology, and more particularly to a method, system and computer storage medium for bandwidth optimization of network applications.

BACKGROUND OF THE INVENTION

With the rapid development of Internet technology, more and more network applications require network access. These network applications often contain intensive data transmitting and receiving operations, especially software for downloading or online watching, which may take up a large amount of bandwidth, and may interfere with the normal use and operation of other network applications. For example, various computer applications are often used simultaneously for network accessing processes, including browsing a webpage, downloading multimedia files, and playing video online. However, network accessing processes, such as downloading multimedia files and playing video online, may seize a large percentage of network bandwidth, thereby affecting the network bandwidth required when the user is browsing a webpage.

Network applications include downloading software, browsers, P2P video live player, etc., and meet the diverse needs of a user who is accessing a network. Downloading software can provide the user with several downloading modes, such as game-preferred mode and Internet accessing-preferred mode, which aim to prevent taking up too much network bandwidth that may negatively affect the network bandwidth required for playing games or browsing a webpage. However, among the many network applications that have network access, only the downloading software can limit its network bandwidth occupancy while other network applications may still take up a large amount of network bandwidth, thereby affecting the user's network access. Thus, a smooth network access cannot be guaranteed.

A browser can limit the bandwidth occupancy of other applications when it detects that the user is accessing the network via the browser such that the required network bandwidth for the user to use the browser may be guaranteed. However, this may block the network accessing requests of other network applications, thereby preventing the other network applications from getting normal responses.

SUMMARY OF THE INVENTION

Based on the above, there is a need to provide a method for bandwidth optimization of network applications, which may improve network fluency.

Furthermore, there is also a need to provide a system for bandwidth optimization of network applications, which may improve network fluency.

Still further, there is also a need to provide a computer storage medium for bandwidth optimization of network applications, which may improve network fluency.

According to one aspect of the invention, a method for bandwidth optimization of network applications includes:

classifying and identifying running network applications according to a set profile and obtaining network applications of a first category;

estimating the bandwidth of the running network applications and obtaining available bandwidth of network applications of the first category;

obtaining the bandwidth occupied by network applications of the first category and determining whether the bandwidth occupied by network applications of the first category is higher than the available bandwidth; and if yes, then adjusting the bandwidth occupied by network applications of the first category.

According to one further aspect of the invention, a system for bandwidth optimization of network application includes:

an identifying device configured to classify and identify the running network applications according to a set profile and to obtain network applications of a first category;

a processing device configured to estimate the bandwidth of the running network applications and to obtain available bandwidth of network applications of the first category;

a determining device configured to obtain the bandwidth occupied by network applications of the first category and to determine whether the bandwidth occupied by network applications of the first category is higher than the available bandwidth; and if yes, notifying an adjusting device;

the adjusting device configured to adjust the bandwidth occupied by network applications of the first category.

According to a still further aspect of the invention, a non-transitory computer-readable storage medium storing terminal-executable instructions, which, when executed by one or more terminals, causes the one or more terminals to perform a method for bandwidth optimization. The method includes:

classifying and identifying the running network applications according to a set profile and obtaining network applications of a first category;

estimating the bandwidth of the running network applications and obtaining available bandwidth of the network applications of the first category;

obtaining the bandwidth occupied by the network applications of the first category and determining whether the bandwidth occupied by network applications of the first category is higher than the available bandwidth; and if yes, then adjusting the bandwidth occupied by network applications of the first category.

By the above method, system, and computer-readable storage medium for bandwidth optimization, the running network applications are classified, and those network applications that require bandwidth optimization are classified into a first category. When the bandwidth occupied by network applications of the first category is higher than the corresponding available bandwidth, the network bandwidth occupied by network applications of the first category is adjusted, so as to prevent network applications of the first category from occupying excessive network bandwidth and affecting the normal use of other network applications. Thus, the possibility of network congestion is reduced and the network fluency of the network applications of the system is improved.

By the above method, system, and computer-readable storage medium for bandwidth optimization, running network applications are classified according to a profile, which may improve the flexibility of the system. Furthermore, when necessary, the classification rules may be changed easily by altering the profile and issuing a new profile. In this way, the system can run on multiple user computers with the ability of rapid expansion, thereby accommodating the diverse needs of different users.

DETAILED DESCRIPTION OF THE PREFERRED EMBODIMENTS

Figure 1:
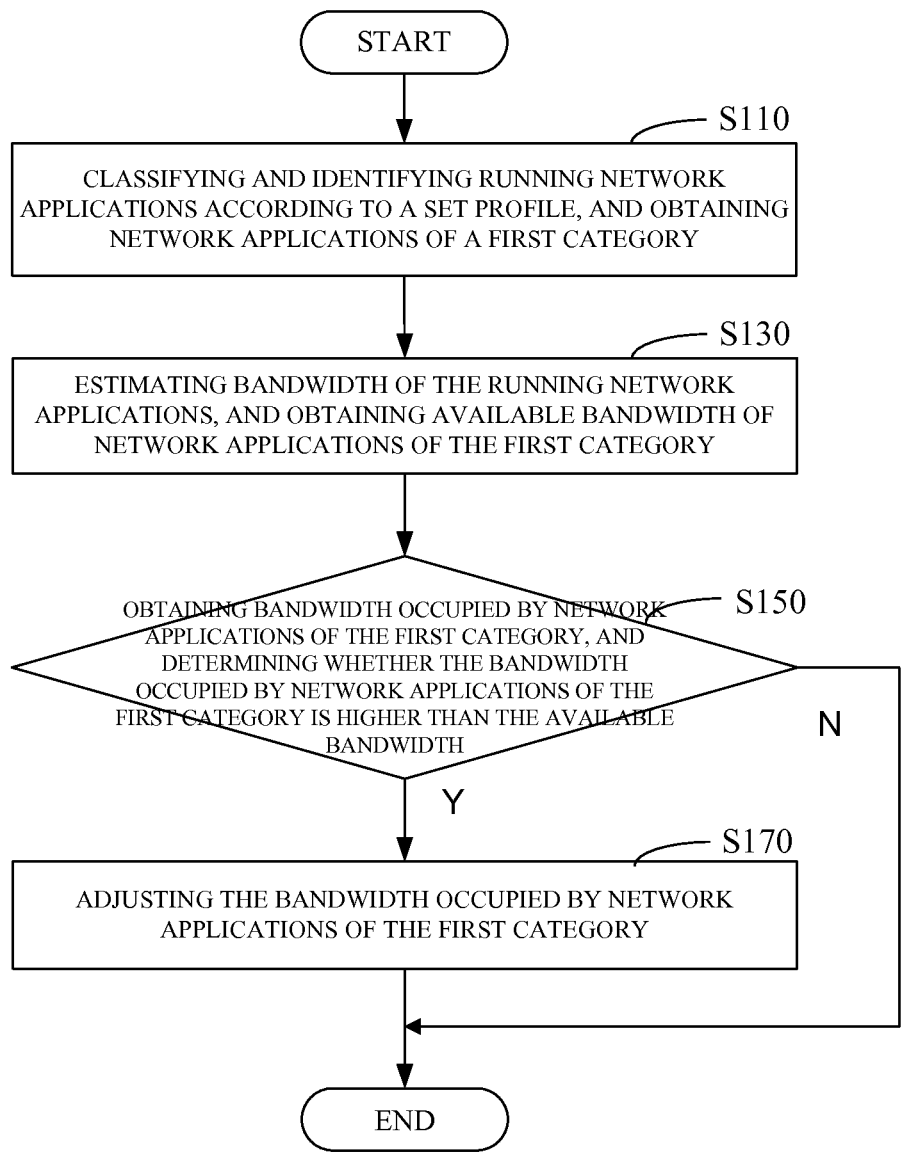
FIG. 1 is a diagram showing a method for bandwidth optimization of network applications in one embodiment of the present invention.

FIG. 1 is a diagram showing a method for bandwidth optimization of network applications in one embodiment of the present invention, the method includes the following steps.

Step S100: classifying and identifying the running network applications according to a set profile, and obtaining network applications of a first category.

In this embodiment, the demands for network bandwidth may vary with different running network applications. For example, browser software may not occupy much network bandwidth, but such software typically requires that it not be affected by other software when accessing the network. Additionally, some core processes (e.g. system software) may cause system instability once their network access is limited. Downloading software also takes up a large amount of network bandwidth during the downloading process, thereby negatively affecting other applications that require access to the network. Therefore, in order to achieve bandwidth optimization of network applications and to ensure network fluency, network applications, such as downloading software, that are prone to seize a large amount of network bandwidth should be limited so as to reduce the network bandwidth they occupy.

Therefore, a profile is actually an identifying rule to network applications. The profile is based on a set profile that the running network applications are classified and identified, so as to identify network applications of the first category. Network applications of the first category are software, such as downloading software, which are prone to seize a large amount of network bandwidth, thus affecting the network access of other software.

Figure 2:
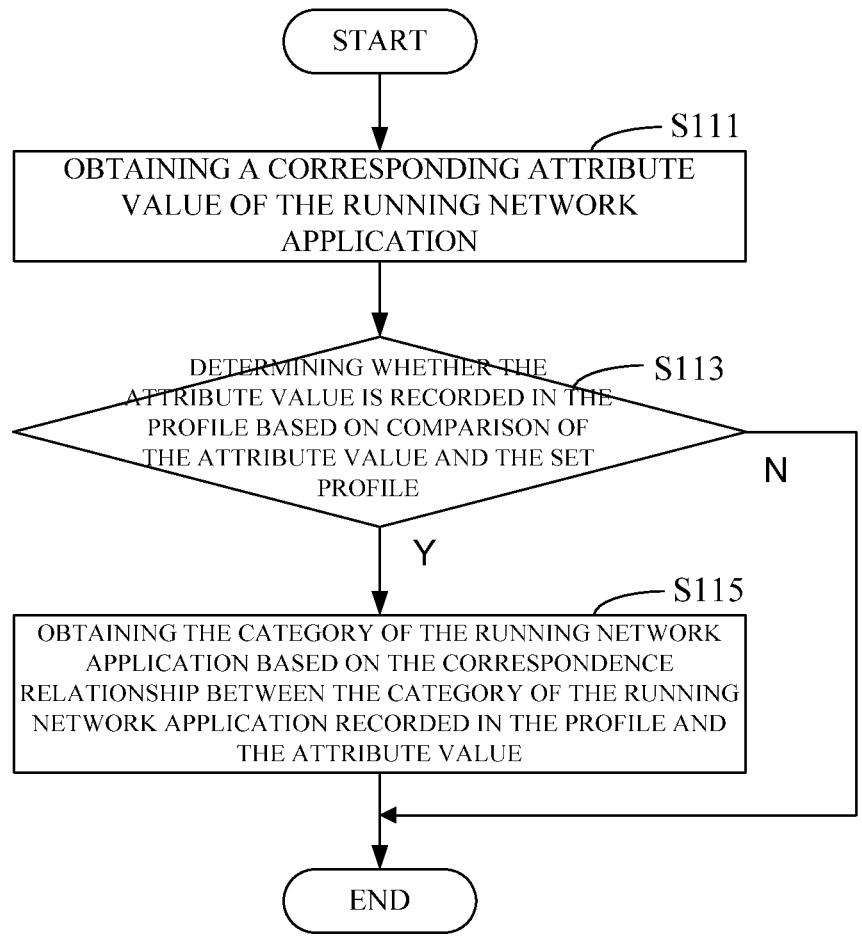
FIG. 2 is a diagram showing a method for classifying the running network applications according to a preset profile and obtaining network applications of the first category.

In one embodiment, as shown in FIG. 2, the above Step S100 includes:

Step S111: obtaining the corresponding attribute value of a running network application.

In this embodiment, applying the classifying rule to the running network applications should be based on the attribute value of the network application. The attribute value includes at least one of the process name, the message digest value, and the digital signature of the network application. Preferably, the message digest value is an MD5 checksum value.

Step S113: determining whether the attribute value is recorded in the profile based on comparison of the attribute value and the set profile; if yes, then perform Step S115; and if no, then go to END.

In this embodiment, if the running network application is in accordance with the information recorded in the profile, then it indicates that optimization of network bandwidth of this network application can be performed.

Step S115: obtaining the category of the running network application based on the corresponding relationship between the category of the running network application recorded in the profile and the attribute value.

In this embodiment, there are three categories: a first category, a second category, and a third category. Specifically, network applications of the first category, such as downloading software, are prone to seize a large amount of network bandwidth, thereby affecting the network access of other software. Network applications of the second category, such as browser software, require not to be affected by other software when accessing the network. Finally, network applications of the third category, such as core processes (e.g. system software), may cause system instability easily once their network access is limited.

The profile is preferably an XML (Extensible Markup Language) file, which is small and has simple data form, and thus is easy to amend and update. The corresponding relationship between the category of the network application and the attribute value is recorded in the profile. For example, if the attribute value of a network application is the message digest value, the profile is queried as to whether the message digest value is recorded therein. If the message digest value is recorded in the profile, then the category of the network application is obtained according to the corresponding relationship between the recorded message digest value recorded and the category of the network application. If the message digest value is not recorded in the profile, then the process terminates (i.e., go to END). If the attribute of the network application includes the process name and the digital signature, then the profile is queried as to whether the same process name and digital signature are recorded therein. If they are (i.e. YES), then the category of the network application is obtained according to the corresponding relationship between the recorded process name and the recorded digital signature and the category of the network application.

Step S130: estimating the network bandwidth of the running network applications and obtaining available bandwidth of network applications of the first category.

In this embodiment, network applications of the first category have taken up a large amount of network bandwidth, often affecting the network access of the other network applications. Therefore, the available bandwidth of the network applications of the first category should be estimated based on all running network applications, so as to allot network bandwidth for network applications of each category reasonably.

Figure 3:
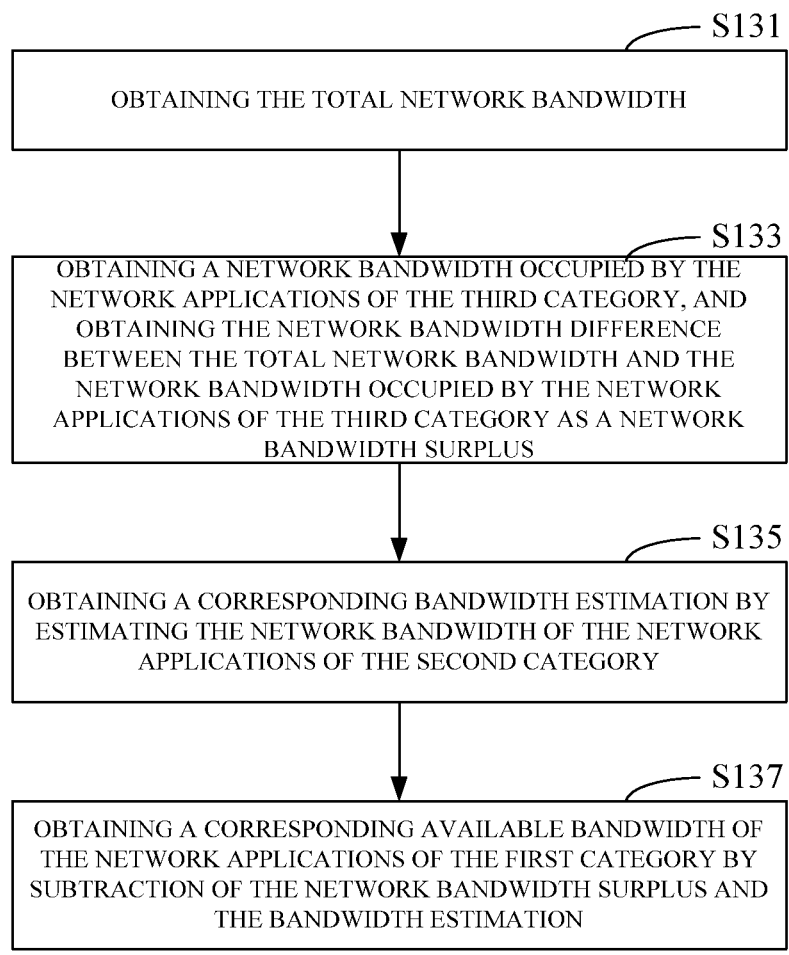
FIG. 3 is a diagram showing a method for estimating the bandwidth of the running network applications and obtaining available bandwidth of network applications of the first category.

In one embodiment, as shown in FIG. 3, the above Step S130 includes:

Step S131: obtaining the total network bandwidth.

In this embodiment, the total network bandwidth should be no lower than the sum of bandwidth of network transmission being used by all running network applications. The total network bandwidth may be obtained by setting a maximum bandwidth of network transmission in a special period as a standard, by network speed measurement, or by manually specifying the total network bandwidth available. Specifically, in terms of network measurement, the total network bandwidth may be obtained by concurrent multi-threaded data transmission in the network or the maximum bandwidth of network transmission may be obtained by pressure test and the maximum bandwidth will be made as the total network bandwidth.

Figure 4:
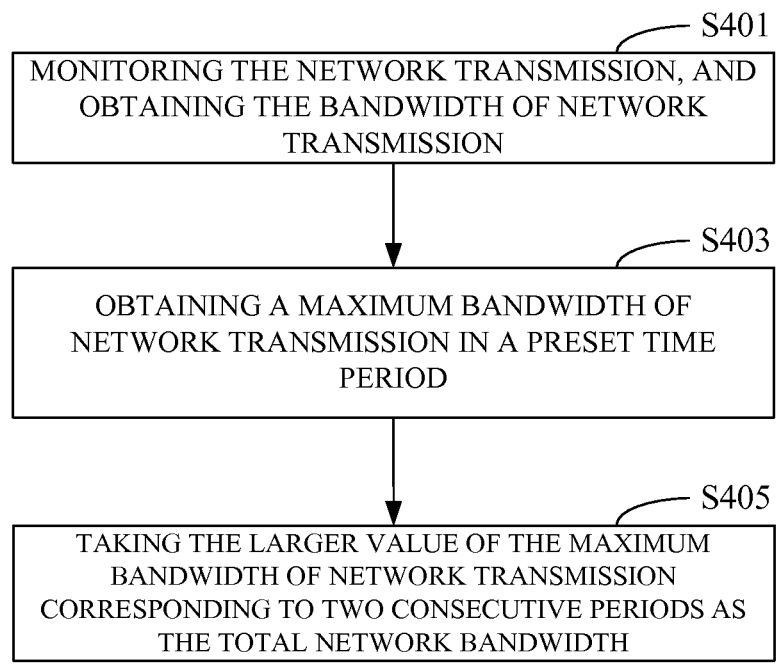
FIG. 4 is a diagram showing a method for obtaining the total network bandwidth in one embodiment of the present invention.

In one embodiment, as shown in FIG. 4, the step of obtaining the total network bandwidth includes:

Step S401: monitoring the network transmission and obtaining the bandwidth of network transmission.

In this embodiment, by monitoring the network transmission status of the computer, the bandwidth of network transmission of all running network application is obtained.

Step S403: obtaining a maximum bandwidth of network transmission in a preset time period.

In this embodiment, the network access of the network applications is often unstable. Considering that network access of the running network applications has relatively large fluctuations, the maximum bandwidth of network transmission in a period is obtained according to the set period in order to assure accuracy. This period is set flexibly according to the needs of actual operation.

Step S405: taking the larger value of the maximum bandwidth of network transmission corresponding to two consecutive periods as the total network bandwidth.

In this embodiment, the total network bandwidth is always changing as a result of the access status of the network applications. Therefore, the larger value of the maximum bandwidth of network transmission corresponding to two consecutive periods is set as the total network bandwidth, which ensures the accuracy of the total network bandwidth without consuming too many system resources to cope with changes in network conditions.

Figure 5:
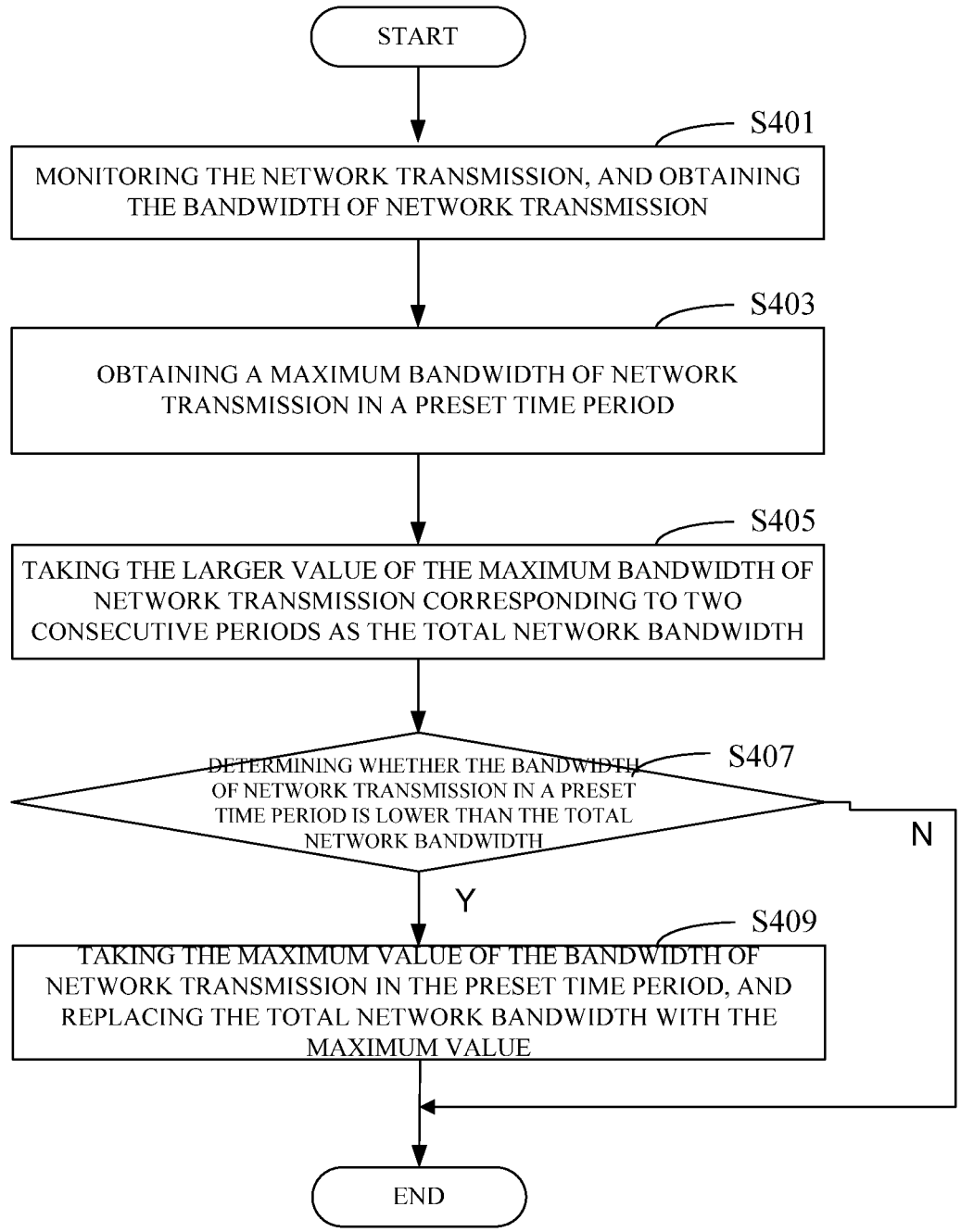
FIG. 5 is a diagram showing a method for obtaining the total network bandwidth in another embodiment of the present invention.

In another embodiment, as shown in FIG. 5, after the step of taking the larger value of the maximum bandwidth of network transmission corresponding to two consecutive periods as the total network bandwidth, the method further includes:

Step S407: determining whether the bandwidth of network transmission in a preset time period is lower than the total network bandwidth; if yes, then perform Step S409; and if not, then go to END.

In this embodiment, the changes in network environments are often unpredictable. The situation of network congestion may occur during network applications accessing the network, which may lead the user to take the initiative to change the network. Therefore, when it is determined that the bandwidth of network transmission monitored within a preset time period are all lower than the total current network bandwidth, the system indicates that the total network bandwidth has become inaccurate, and the maximum bandwidth of network transmission within the preset time period should be made as a new total network bandwidth to prevent the calculated total network bandwidth from being affected by those external network environments.

After the larger value of the maximum bandwidth of network transmission corresponding to two consecutive periods is made as the total network bandwidth, a real-time monitoring of the network environment within a preset time period may be performed to cope with the complicated network environment in the process of actual operation. During the real-time monitoring process, if the bandwidth of network transmission has always been lower than the total network bandwidth, it indicates that the current total network bandwidth is not accurate. In this situation, the total network bandwidth needs to be adjusted to provide a strong guarantee of obtaining accurate total network bandwidth.

Step S409: choosing the maximum value of the bandwidth of network transmission in the preset time period and replacing the total network bandwidth with the maximum value.

Step S133: obtaining the network bandwidth occupied by network applications of the third category and obtaining the network bandwidth difference between the total network bandwidth and the network bandwidth occupied by network applications of the third category as network bandwidth surplus.

In this embodiment, the network bandwidth occupied by network applications of the third category is not allowed to be limited. Thus the network applications of the third category should be exempted from the process of network bandwidth optimization.

Step S135: obtaining the corresponding bandwidth estimation by estimating the network bandwidth of network applications of the second category.

In this embodiment, for browser software and other network applications of the second category, which require smooth network access, the network bandwidth they demand should be estimated reasonably to meet the needs of the current network.

The Step S135 also includes: calculating the percentage of bandwidth occupied by network applications of the second category as to the total network bandwidth, obtaining a gradient range of the percentage of the bandwidth occupied by network applications of the second category to the total bandwidth, and taking the maximum value of the gradient range as the bandwidth estimation.

The percentages of the bandwidth occupied by network applications of the second category to the total network bandwidth are divided into gradients, with the percentage of the bandwidth occupied by network applications of the second category to the total network bandwidth calculated classified into a corresponding gradient range. For example, if the calculated fluctuation of the percentage value of the bandwidth occupied by network applications of the second category to the total network bandwidth is in a range of 32% to 35%, then it falls into the gradient range of 30% to 40%. In this case, the highest value of the gradient range, 40%, is set as the bandwidth estimation. Upon obtaining the bandwidth estimation, it may be increased slightly such that the bandwidth estimation can not only meet the current demand for network access, but also sets aside a certain amount of bandwidth to cope with a sudden increase in the demand for bandwidth of network access and to ensure that the reserved bandwidth will not cause idleness and waste of network bandwidth.

In addition, the method further includes, the step of replacing the bandwidth estimation with the difference between the bandwidth estimation and a set value after the step of taking the maximum value of the gradient range as the bandwidth estimation. The value can be set and adjusted flexibly according to actual needs. For example, the set value may be 5% of the total network bandwidth, which additionally reserves a certain amount of network bandwidth for network application of the first category. This encourages network applications of the second category to appropriately compete for resources with network applications of the first category. This achieves full utilization of network bandwidth and prevents bandwidth occupied by network applications of the first category from excessive limitation due to inaccurate total network bandwidth.

Where gradient ranges are descending from a higher gradient to another lower gradient, it indicates that at present the fluctuation of the network access of network applications of the second category is extremely sharp. Taking into account the fluctuation of the network access of network applications of the second category, the estimation should be calculated after a set waiting period or after the network access of network applications of the second category gets stable.

Step S137: obtaining the corresponding available bandwidth of network applications of the first category by subtraction of the network bandwidth surplus and the bandwidth estimation.

Step S150: obtaining the bandwidth occupied by network applications of the first category and determining whether the bandwidth occupied by network applications of the first category is higher than the available bandwidth; if yes, then perform Step S170; and if no, then go to END.

In this embodiment, when it is determined that the bandwidth occupied by network applications of the first category is higher than the available bandwidth, it indicates that network applications of the first category have occupied too much network bandwidth, and a bandwidth control is necessary.

Step S170: adjusting the bandwidth occupied by network applications of the first category.

In this embodiment, network applications that consume excessive network bandwidth are adjusted so as not to affect other network applications.

Figure 6:
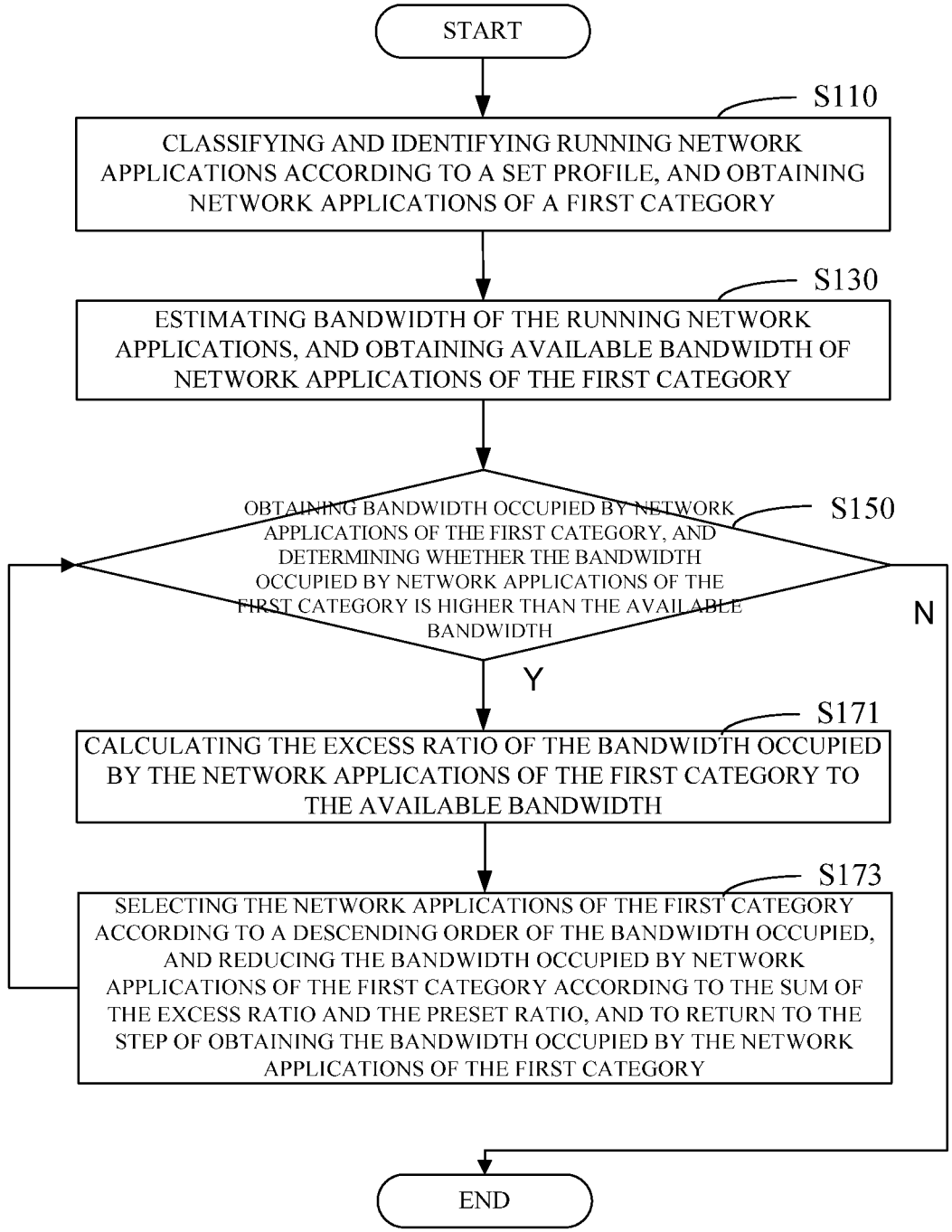
FIG. 6 is a diagram showing a method for adjusting the bandwidth occupied by network applications of the first category.

As shown in the preferred embodiment of FIG. 6, the above step of adjusting the bandwidth occupied by network applications of the first category includes:

Step S171: calculating the excess ratio of the bandwidth occupied by network applications of the first category to the available bandwidth.

In this embodiment, the excess ratio of the bandwidth occupied by a network application to its available bandwidth is calculated. For example, if the bandwidth occupied by a network application is 60 KB/S, and the available bandwidth is 50 KB/S, then the bandwidth occupied exceeds 10 KB/S, and the excess ratio is 20%.

Step S173: selecting network applications of the first category according to a descending order of the bandwidth occupied and reducing the bandwidth occupied by network applications of the first category according to the sum of the excess ratio and the preset ratio, and return to Step S150.

When it is necessary to adjust the bandwidth occupied by network applications of the first category among the network applications of the first category, the network application among the network applications of the first category occupying the highest bandwidth is selected first, and the bandwidth occupied by the selected network application of the first category is reduced. After the bandwidth is reduced, the current embodiment returns to Step S150 to further determine whether the bandwidth occupied by network applications of the first category is still higher than the available bandwidth. If the bandwidth occupied by network applications of the first category is still higher, then Step S171 is performed to calculate the excess ratio and further select network applications to be adjusted based on a descending order of the bandwidth occupied. The set ratio can be adjusted according to actual needs, so as to effectively reduce the bandwidth occupied by network applications of the first category. For example, if the excess ratio is 20% and the set ratio is 10%, then it is the part of 20%+10%=30% of the bandwidth occupied by the selected network application of the first category that should be limited. Thus, if the bandwidth occupied by this network application is 30 KB/S, then the reduced bandwidth occupied by this network application will be 30*70%=21 KB/S.

In addition, in order to prevent network applications of the first category from being over-reduced and causing abnormal operation of the network application, the preferred embodiment determines whether the bandwidth occupied by network applications of the first category is lower than a limit. If the bandwidth occupied by network applications of the first category is lower than a limit (i.e., YES), then the bandwidth occupied by network applications of the first category is set as a limit. For example, the limit may be 10 KB/S. In a preferred embodiment, since there may be fluctuations of the occupied bandwidth, the upper limit of the bandwidth occupied by network applications of the first category may be determined to assure accuracy.

When the bandwidth occupied by network applications of the first category is far lower than the available bandwidth, limitations to bandwidth occupied by respective network applications of the first category may be gradually released after realizing that the bandwidth of network applications of the first category is not higher than the available bandwidth any more.

Figure 7:
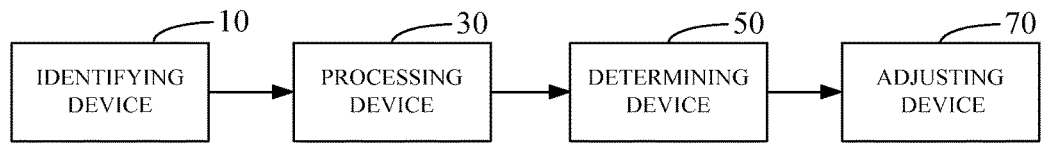
FIG. 7 is a schematic diagram showing a system for bandwidth optimization of network applications in one embodiment of the present invention.

FIG. 7 shows a system for bandwidth optimization of network applications in one embodiment of the present invention, which includes an identifying device 10, a processing device 30, a determining device 50, and an adjusting device 70.

The identifying device 10 is configured to classify and identify the running network applications according to a set profile and to obtain network applications of a first category.

In this embodiment, the demands for network bandwidth may vary with different running network applications. For example, browser software may not occupy much network bandwidth, but such software typically requires that it not to be affected by other software when accessing the network. Additionally, some core processes (e.g. system software) may cause system instability once their network access is limited. Downloading software also takes up a large amount of network bandwidth during the downloading process, thereby negatively affecting other applications that require access to the network. Therefore, in order to achieve bandwidth optimization of network applications and to ensure network fluency, network applications, such as downloading software, that are prone to seize a large amount of network bandwidth should be limited so as to reduce the network bandwidth they occupy.

Therefore, a profile is actually an identifying rule to network applications. The identifying device 10 classifies and identifies the running network applications based on a preset profile to identify network applications of the first category. Network applications of the first category are software, such as downloading software, which are prone to seize a large amount of network bandwidth, thus affecting the network access of other software.

Figure 8:
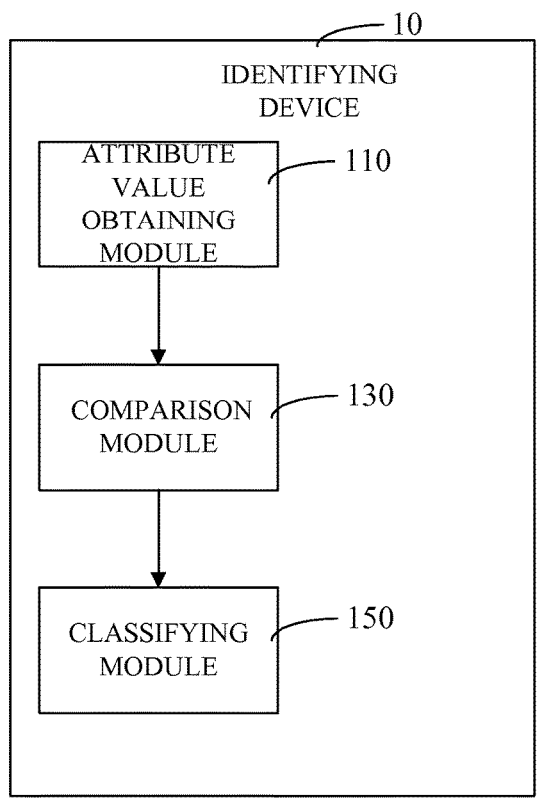
FIG. 8 is a schematic diagram of the identifying module illustrated in FIG. 7.

In one embodiment, as shown in FIG. 8, the identifying device 10 includes an attribute value obtaining module 110, a comparison module 130, and a classifying module 150.

The attribute value obtaining module 110 is configured to obtain the corresponding attribute value of the running network applications.

In this embodiment, applying the classifying rules of the running network applications should based on the attribute value of the network application. The attribute value includes at least one of the process name, the message digest value, and the digital signature of the network application. Preferably, the message digest value is an MD5 checksum value.

The comparison module 130 is configured to determine whether the attribute value is recorded in the profile based on comparison of the attribute value and the set profile; if yes, then notify the classifying module 150; and if no, then go to END.

In this embodiment, if the comparison module 130 determines that running network application is in accordance with the information recorded in the profile, it indicates that optimization of network bandwidth of this network application can be performed.

The classifying module 150 is configured to obtain the category of the running network application based on the corresponding relationship between the category of the running network application recorded in the profile and the attribute value.

In this embodiment, there are three categories: a first category, a second category and a third category. Specifically, network applications of the first category, such as downloading software, are prone to seize a large amount of network bandwidth, thereby affecting the network access of other software. Network applications of the second category, such as browser software, require not to be affected by other software when accessing the network. Finally, network applications of the third category, such as core processes (e.g. system software), may be to cause system instability easily once their network access is limited.

The profile is preferably an XML (Extensible Markup Language) file, which is small and has simple data form, and thus is easy to amend and update. The corresponding relationship between the category of the network application and the attribute value is recorded in the profile. For example, if the attribute value of a network application is the message digest value, the profile is queried as to whether the message digest value is recorded in the profile therein. If the message digest value is recorded in the profile (i.e., YES), then the classifying module 150 obtains the category of the network application according to the corresponding relationship between the message digest value recorded and the category of the network application. If the message digest value is not recorded in the profile, then go to END. If the attributes of the network application are the process name and the digital signature, then the profile is queried as to whether the same process name and digital signature are recorded therein. If they are (e.g. YES), then the classifying module 150 obtains the category of the network application by the classifying module 150 according to the corresponding relationship between the recorded process name and the recorded digital signature recorded and the category of the network application.

The processing device 30 is configured to estimate the bandwidth of the running network applications and to obtain available bandwidth of network applications of the first category.

In this embodiment, network applications of the first category have taken up a large amount of network bandwidth, often affecting the network access of the other network applications. Therefore, the available bandwidth of the network applications of the first category should be estimated by the processing device 30 based on all running network applications, so as to allot network bandwidth for network applications of each category reasonably.

Figure 9:
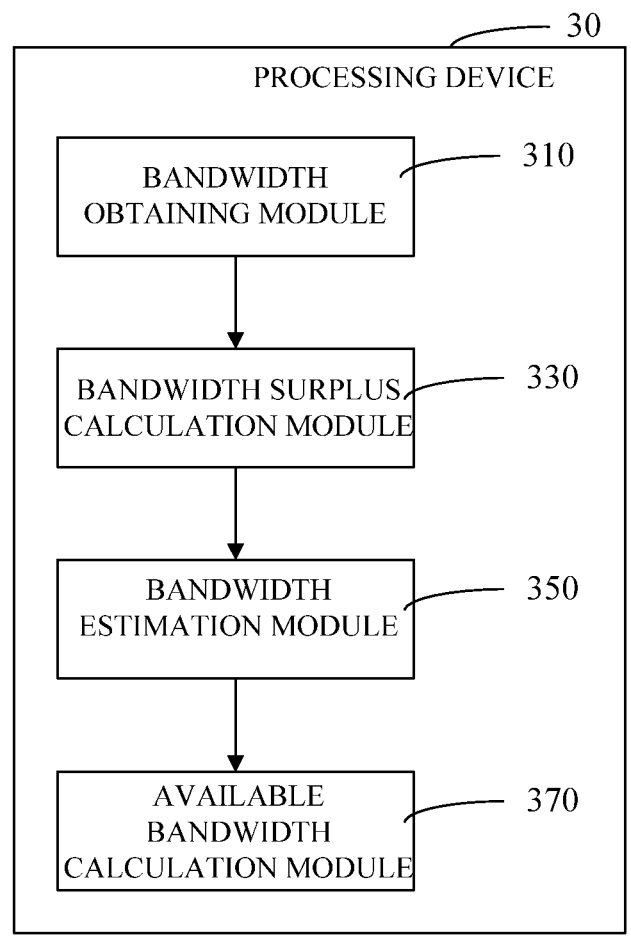
FIG. 9 is a schematic diagram of the processing module shown in FIG. 7.

In one embodiment, as shown in FIG. 9, the processing device 30 includes a bandwidth obtaining module 310, a bandwidth surplus calculation module 330, a bandwidth estimation module 350, and available bandwidth calculation module 370.

The bandwidth obtaining module 310 is configured to obtain the total network bandwidth.

In this embodiment, the total network bandwidth should be no lower than the sum of bandwidth of network transmission being used by all running network applications. The total network bandwidth may be obtained by the bandwidth obtaining module 310 by setting a maximum bandwidth of network transmission in a special period as a standard, by network speed measurement, or by manually specifying the total network bandwidth available. Specifically, in terms of network measurement, the total network bandwidth may be obtained by concurrent multi-threaded data transmission in the network or the maximum bandwidth of network transmission may be obtained by pressure test and the maximum bandwidth will be made as the total network bandwidth.

Figure 10:
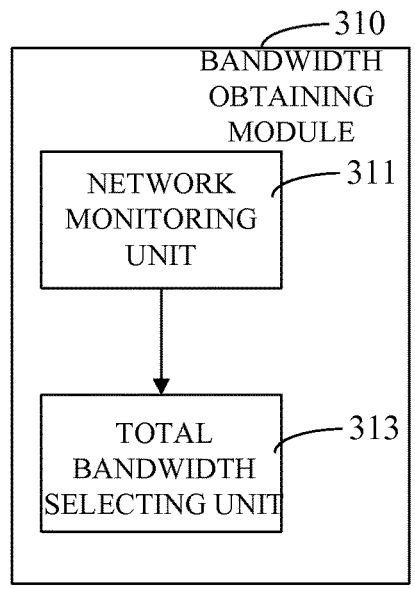
FIG. 10 is a schematic diagram showing the bandwidth obtaining module in one embodiment of the present invention.

In one embodiment, as shown in FIG. 10, the bandwidth obtaining module 310 includes a network monitoring unit 311 and a total bandwidth selecting unit 313.

The network monitoring unit 311 is configured to monitor the network transmission and to obtain the bandwidth of the network transmission.

In this embodiment, the network monitoring unit 311 monitors the network transmission status of the computer and obtains the bandwidth of network transmission of all running network application.

The total bandwidth selecting unit 313 is configured to obtain a maximum bandwidth of network transmission corresponding to a preset time period and to take the larger value of the maximum bandwidth of network transmission corresponding to two consecutive time periods as the total network bandwidth.

In this embodiment, the network access of the network applications is often unstable. Considering that network access of the running network applications has relatively large fluctuations, the maximum bandwidth of network transmission in a period is obtained by the total bandwidth selecting unit 313a according to the set period in order to assure accuracy. This period is set flexibly according to the needs of actual operation.

The total network bandwidth is always changing as a result of the access status of the network applications.

Therefore, the larger value of the maximum bandwidth of network transmission corresponding to two consecutive periods is set by the total bandwidth selecting unit 313 as the total network bandwidth, which ensures the accuracy of the total network bandwidth without consuming too many system resources to cope with changes of network conditions.

Figure 11:
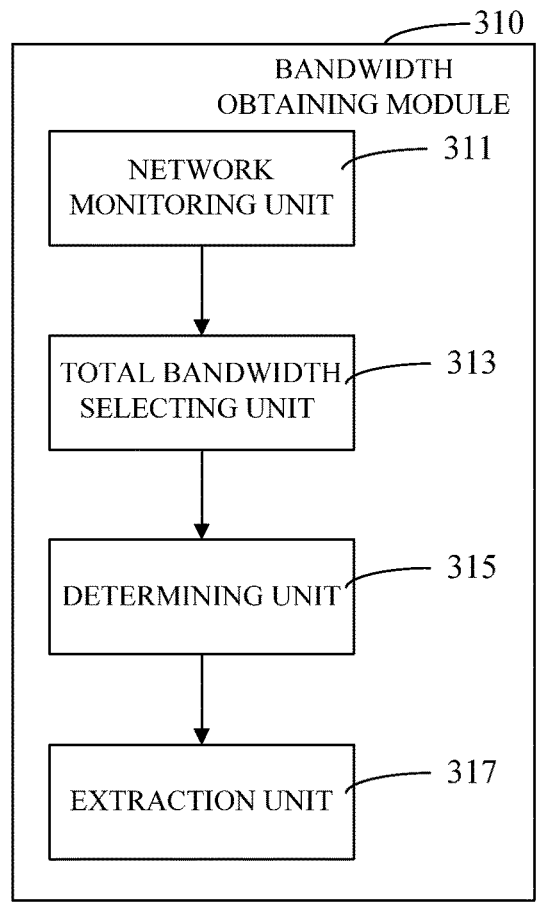
FIG. 11 is a schematic diagram showing the bandwidth obtaining module in another embodiment of the present invention.

In another embodiment, as shown in FIG. 11, the above bandwidth obtaining module 310 includes, in addition to the network monitoring unit 311 and the total bandwidth selecting unit 313, a determining unit 315 and an extraction unit 317.

The determining unit 315 is configured to determine whether the bandwidth of network transmission is lower than the total network bandwidth in a preset time period; if yes, notify the extraction unit 317; and if not, then go to END.

In this embodiment, the changes in network environments are often unpredictable. The situation of network congestion may occur during the network applications accessing the network, which may lead the user to take the initiative to change the network. Therefore, when the determining unit 315 determines that the bandwidth of network transmission monitored within a preset time period is always lower than the total current network bandwidth, it indicates that the total network bandwidth has become inaccurate, and the maximum bandwidth of network transmission within the preset time period should be made as a new total network bandwidth to prevent the calculated total network bandwidth from being affected by those external network environments.

After the larger value of the maximum bandwidth of network transmission corresponding to two consecutive periods is made as the total network bandwidth, a real-time monitoring of the network environment within a preset time period may be performed to cope with the complicated network environment in the process of actual operation. During the real-time monitoring process, if the bandwidth of network transmission has always been lower than the total network bandwidth, it indicates that the current total network bandwidth is not accurate. In this situation, the total network bandwidth needs to be adjusted to provide a strong guarantee of obtaining accurate total network bandwidth.

The extraction unit 317 is configured to take the maximum value of the bandwidth of network transmission in the preset time period and to replace the total network bandwidth with this maximum value.

The bandwidth surplus calculation module 330 is configured to obtain the network bandwidth occupied by network applications of the third category and to obtain the network bandwidth difference between the total network bandwidth and the network bandwidth occupied by network applications of the third category as network bandwidth surplus.

In this embodiment, the network bandwidth occupied by network applications of the third category is not allowed to be limited. Thus, the network applications of the third category should be exempted from the process of network bandwidth optimization.

The bandwidth estimation module 350 is configured to obtain the corresponding bandwidth estimation by estimating the network bandwidth of the network applications of the second category.

In this embodiment, the network bandwidth demanded for browser software and other network applications of the second category, which require smooth network access, should be reasonably estimated by the bandwidth estimation module 350 to meet the needs of current network conditions.

Specifically, the bandwidth estimation module 350 is also configured to calculate the percentage of the bandwidth occupied by network applications of the second category to the total network bandwidth, to obtain the gradient range of the percentage of the bandwidth occupied by network applications of the second category to the total bandwidth, and to take the maximum value of the gradient range as the bandwidth estimation.

The percentages of the bandwidth occupied by network applications of the second category to the total network bandwidth are pre-divided into gradients. The percentage of the bandwidth occupied by network applications of the second category to the total network bandwidth calculated by the bandwidth estimation module 350 each time can be found in the corresponding gradient range in the pre-divided gradients. For example, if the bandwidth estimation module 350 calculates that fluctuation of the percentage value of the bandwidth occupied by network applications of the second category to the total network bandwidth is in a range of 32% to 35%, then it falls into the gradient range of 30% to 40%. In this case, the highest value of the gradient range, 40%, is made as the bandwidth estimation. Upon obtaining the bandwidth estimation by the bandwidth estimation module 350, it may be increased slightly, such that the bandwidth estimation can not only meet the current demand for network access, but also sets aside a certain amount of bandwidth to cope with sudden growth in demand for bandwidth of network access, and to ensure that the reserved bandwidth will not cause idleness and waste of network bandwidth.

In addition, the bandwidth estimation module 350 is also configured to replace the bandwidth estimation with the difference between the bandwidth estimation and a set value. The value can be set and adjusted flexibly according to actual needs. For example, the set value may be 5% of the total network bandwidth, which additionally reserves a certain amount of network bandwidth for network application of the first category, and thus encourages network applications of the second category to appropriately compete for resources with network applications of the first category. This achieves full utilization of network bandwidth and prevents excessive limitation to bandwidth occupied by network applications of the first category due to inaccurate total network bandwidth.

Where gradient ranges are descending from a higher gradient to another lower gradient, it indicates that a present the fluctuation of the network access of network applications of the second category is extremely sharp. Taking into account the fluctuation of the network access of network applications of the second category, the bandwidth estimation module 350 should calculate the estimation after a set waiting time or after the network access of network applications of the second category gets stable.

The available bandwidth calculation module 370 is configured to obtain the corresponding available bandwidth of network applications of the first category by subtraction of the network bandwidth surplus and the bandwidth estimation.

The determining device 50 is configured to obtain the bandwidth occupied by network applications of the first category and to determine whether the bandwidth occupied by the network applications of the first category are higher than the available bandwidth; and if yes, notify the adjusting device 70; and if not, then go to END.

In this embodiment, when the determining device 50 determines that the bandwidth occupied by network applications of the first category is higher than the available bandwidth, it indicates that network applications of the first category have occupied too much network bandwidth, and a bandwidth control by an adjusting device 70 is necessary.

The adjusting device 70 is configured to adjust the bandwidth occupied by network applications of the first category.

In this embodiment, the adjusting device 70 is configured to adjust network applications that have consumed too much network bandwidth so as to reduce the bandwidth they occupy and to avoid affecting the other network applications.

In this embodiment, the adjusting device 70 is also configured to calculate the excess ratio of the bandwidth occupied by network applications of the first category to the available bandwidth for network applications of the first category, to select network applications of the first category according to the descending order of the bandwidth occupied, to reduce the bandwidth occupied by network applications of the first category according to the sum of the excess ratio and the set ratio, and to notify the determining module 50.

The adjusting device 70 is configured to calculate the excess ratio of the bandwidth occupied by a network application to its available bandwidth. For example, if the bandwidth occupied by network applications is 60 KB/S, and the available bandwidth is 50 KB/S, then the bandwidth occupied exceeds 10 KB/S, and the excess ratio is 20%.

When it is necessary to adjust the bandwidth occupied by network applications of the first category, the adjusting device 70 selects, among network applications of the first category, the one occupying the highest bandwidth first, and reduces the bandwidth occupied by the selected network application of the first category. After the bandwidth is reduced, the determining device 50 further determines whether the bandwidth occupied by network applications of the first category is still higher than the available bandwidth. If the bandwidth occupied by network applications of the first category is still higher, then the adjusting device 70 calculates the excess ratio, and further selects network applications to be adjusted based on a descending order of the bandwidth occupied. The set ratio can be adjusted according to actual needs, so as to effectively reduce the bandwidth occupied by network applications of the first category. For example, if the excess ratio is 20%, and the preset ratio is 10%, then it is the part of 20%+10%=30% of the bandwidth occupied by the selected network application of the first category that should be limited. Thus, if the bandwidth occupied by this network application is 30 KB/S, then the reduced bandwidth occupied by this network application will be 30*70%=21 KB/S.

In addition, in order to prevent the network applications of the first category from being over-reduced and the abnormal operation of the network application caused thereof, the determining module 70 determines whether the bandwidth occupied by network applications of the first category is lower than the limit. If the bandwidth occupied by network applications of the first category is lower than a limit (e.g. YES), then the bandwidth occupied by network applications of the first category is set as a limit. For example, the limit may be 10 KB/S. In a preferred embodiment, since there may be fluctuations of the occupied bandwidth, the upper limit of the bandwidth occupied by network applications of the first category can be determined in order to ensure the accuracy.

When the bandwidth occupied by network applications of the first category is far lower than the available bandwidth, limitations to bandwidth occupied by respect network application of the first category may be gradually released after realizing that the bandwidth of network applications of the first category is not higher than the available bandwidth any more.

Furthermore, the present invention also provides a non-transitory computer-readable storage medium storing mobile terminal-executable instructions which, when executed, control the mobile terminal to perform the above method for bandwidth optimization of network applications. The specific steps of the bandwidth optimization method of the mobile terminal-executable instructions stored in computer-readable storage medium are described as above, and will not go into details here.

The bandwidth optimization of network applications by the above method, system, and computer-readable storage medium is performed periodically at preset time intervals.

By the above method, system, and computer-readable storage medium for bandwidth optimization, the running network applications are classified, and those network applications that require bandwidth optimization are classified into a first category. When the bandwidth occupied by network applications of the first category is higher than the corresponding available bandwidth, the network bandwidth occupied by network applications of the first category is adjusted, so as to prevent network applications of the first category from occupying excessive network bandwidth and affecting the normal use of other network applications. Thus, the possibility of network congestion is reduced and the network fluency of the network applications of the system is improved.

By the above method, system, and computer-readable storage medium for bandwidth optimization, running network applications are classified according to a profile, which may improve the flexibility of the system, for the classification rules may be easily changed when necessary by altering the profile and issuing a new profile; the system can run in a variety of user computers with the ability of rapid expansion, which helps accommodate the diverse needs of different users.

The embodiments are chosen and described in order to explain the principles of the invention and their practical application so as to allow others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for bandwidth optimization of network application that access network bandwidth, comprising:
    classifying and identifying running network applications according to a set profile and obtaining network applications of a first category;
    estimating bandwidth of the running network applications and obtaining available bandwidth of network applications of the first category;
    obtaining bandwidth occupied by network applications of the first category and determining whether the bandwidth occupied by network applications of the first category is higher than the available bandwidth; and
    when the bandwidth occupied by network applications of the first category is higher than the available bandwidth, then
    adjusting the bandwidth occupied by network applications of the first category by calculating an excess ratio of the bandwidth occupied by the network applications of the first category to available bandwidth, selecting the network applications of the first category according to a descending order of the bandwidth occupied and reducing the bandwidth occupied by the network applications of the first category according to a sum of the excess ratio and a preset ratio, whereby the network bandwidth accessed by the network applications of the first category is optimized, wherein the step of classifying and identifying running network applications according to a set profile, and obtaining network applications of a first category comprises:

obtaining a corresponding attribute value of the running network application;

determining whether the attribute value is recorded in the profile based on comparison of the attribute value and the set profile; and when the attribute value is recorded in the profile based on comparison of the attribute value and the set profile, then obtaining the category of the running network application based on a corresponding relationship between the category of the running network application recorded in the profile and the attribute value, and wherein the categories comprise a first category, a second category and a third category, the network applications of the first category are downloading software; the network applications of the second category are browser software; and the network applications of the third category are core processes of system software, the step of estimating the network bandwidth of the running network applications and obtaining an available bandwidth of network applications of the first category comprises:

obtaining total network bandwidth;

obtaining a network bandwidth occupied by the network applications of the third category, and obtaining a network bandwidth difference between the total network bandwidth and a network bandwidth occupied by the network applications of the third category as a network bandwidth surplus;

obtaining a corresponding bandwidth estimation by estimating the network bandwidth of the network applications of the second category;

obtaining a corresponding available bandwidth of the network applications of the first category by subtraction of a network bandwidth surplus and the bandwidth estimation, and the step of obtaining the corresponding bandwidth estimation by estimating the network bandwidth of the network applications of the second category comprises:

calculating a percentage of the bandwidth occupied by the network applications of the second category to the total network bandwidth;

obtaining a gradient range of a percentage of the bandwidth occupied by network applications of the second category to the total bandwidth; and taking a maximum value of the gradient range as the bandwidth estimation.

2. The method of claim 1, wherein the step of obtaining the total network bandwidth further comprises:

monitoring a network transmission and obtaining a bandwidth of network transmission;

obtaining a maximum bandwidth of network transmission in a preset time period;

taking a larger value of the maximum bandwidth of network transmission corresponding to two consecutive periods as total network bandwidth.

3. The method of claim 2, wherein after the step of taking the larger value of the maximum bandwidth of network transmission corresponding to two consecutive periods as the total network bandwidth, the method further comprises:

determining whether the bandwidth of network transmission in a preset time period is lower than the total network bandwidth; and when the bandwidth of network transmission in a preset time period is lower than the total network bandwidth, then taking a maximum value of the bandwidth of network transmission in the preset time period and replacing the total network bandwidth with the maximum value.

4. The method of claim 1, wherein after the step of taking the maximum value of the gradient range as the bandwidth estimation, the method further comprises:

replacing the bandwidth estimation with the difference between the bandwidth estimation and a set value.

5. The method of claim 1, wherein the step of adjusting the bandwidth occupied by network applications of the first category further comprises:

repeating the step of obtaining the bandwidth occupied by the network applications of the first category.

6. A system for bandwidth optimization of network applications, comprising:

non-transitory computer-readable storage medium having stored thereon executable instructions for performing a method to classify and identify running network applications according to a set profile and to obtain network applications of a first category; to estimate bandwidth of the running network applications and to obtain available bandwidth of the network applications of the first category; to obtain bandwidth occupied by the network applications of the first category and to determine whether the bandwidth occupied by the network applications of the first category is higher than the available bandwidth; and when the bandwidth occupied by the network applications of the first category is higher than the available bandwidth, adjusting the bandwidth occupied by the network applications of the first category by calculating an excess ratio of the bandwidth occupied by network applications of the first category to the available bandwidth, selecting the network applications of the first category according to a descending order of the bandwidth occupied, reducing the bandwidth occupied by network applications of the first category according to a sum of the excess ratio and a preset ratio, whereby the network bandwidth accessed by the network applications of the first category is optimized; the classifying and identifying running network applications according to a set profile, and obtaining network applications of a first category comprises obtaining a corresponding attribute value of the running network application, determining whether the attribute value is recorded in the profile based on comparison of the attribute value and the set profile; and when the attribute value is recorded in the profile based on comparison of the attribute value and the set profile, then obtaining the category of the running network application based on a corresponding relationship between the category of the running network application recorded in the profile and the attribute value; the categories comprise a first category, a second category and a third category, and the network applications of the first category are downloading software, the network applications of the second category are browser software, and the network applications of the third category are core processes of system software; the estimating the network bandwidth of the running network applications and obtaining an available bandwidth of network applications of the first category comprises obtaining total network bandwidth, obtaining a network bandwidth occupied by the network applications of the third category, and obtaining a network bandwidth difference between the total network bandwidth and a network bandwidth occupied by the network applications of the third category as a network bandwidth surplus, obtaining a corresponding bandwidth estimation by estimating the network bandwidth of the network applications of the second category, obtaining a corresponding available bandwidth of the network applications of the first category by subtraction of a network bandwidth surplus and the bandwidth estimation, wherein obtaining a corresponding bandwidth estimation by estimating the network bandwidth of the network applications of the second category includes calculating the percentage of bandwidth occupied by the network applications of the second category to total network bandwidth, obtaining a gradient range of the percentage of the bandwidth occupied by network applications of the second category to the total bandwidth, and taking a maximum value of the gradient range as the bandwidth estimation; and at least one terminal coupled to the storage medium configured to execute the executable instructions to cause the control system to perform the method.

7. The system of claim 6, further comprising:

monitoring the network transmission and obtaining a bandwidth of the network transmission; and obtaining a maximum bandwidth of network transmission corresponding to a preset time period and taking a larger value of maximum bandwidth of network transmission corresponding to two consecutive periods as the total network bandwidth.

8. The system of claim 7, further comprising:

determining whether the bandwidth of network transmission in a preset time period is lower than the total network bandwidth; when the bandwidth of network transmission in a preset time period is lower than the total network bandwidth, then;

taking a maximum value of the bandwidth of network transmission in the preset time period and replacing the total network bandwidth with the maximum value.

9. The system of claim 6, further comprising: replacing the bandwidth estimation with a difference between the bandwidth estimation and a set value.

10. A non-transitory computer-readable storage medium storing mobile terminal-executable instructions which, when executed, control a mobile terminal to perform a method for bandwidth optimization of network applications that access network bandwidth, the method comprising:

classifying and identifying running network applications according to a set profile and obtaining network applications of a first category;

estimating bandwidth of running network applications and obtaining available bandwidth of network applications of the first category;

obtaining bandwidth occupied by network applications of the first category and determining whether the bandwidth occupied by network applications of the first category is higher than the available bandwidth; and when the bandwidth occupied by network applications of the first category is higher than the available bandwidth, then adjusting the bandwidth occupied by network applications of the first category by calculating an excess ratio of the bandwidth occupied by the network applications of the first category to available bandwidth, selecting the network applications of the first category according to a descending order of the bandwidth occupied and reducing the bandwidth occupied by the network applications of the first category according to a sum of the excess ratio and a preset ratio, whereby the network bandwidth accessed by the network applications of the first category is optimized, wherein the step of classifying and identifying running network applications according to a set profile, and obtaining network applications of a first category comprises:

obtaining a corresponding attribute value of the running network application;

determining whether the attribute value is recorded in the profile based on comparison of the attribute value and the set profile; and when the attribute value is recorded in the profile based on comparison of the attribute value and the set profile, then obtaining the category of the running network application based on a corresponding relationship between the category of the running network application recorded in the profile and the attribute value, and wherein the categories comprise a first category, a second category and a third category, the network applications of the first category are downloading software; the network applications of the second category are browser software; and the network applications of the third category are core processes of system software; and the step of estimating the network bandwidth of the running network applications and obtaining an available bandwidth of network applications of the first category comprises:

obtaining total network bandwidth;

obtaining a network bandwidth occupied by the network applications of the third category, and obtaining a network bandwidth difference between the total network bandwidth and a network bandwidth occupied by the network applications of the third category as a network bandwidth surplus;

obtaining a corresponding bandwidth estimation by estimating the network bandwidth of the network applications of the second category;

obtaining a corresponding available bandwidth of the network applications of the first category by subtraction of a network bandwidth surplus and the bandwidth estimation, and the step of obtaining the corresponding bandwidth estimation by estimating the network bandwidth of the network applications of the second category comprises:

calculating a percentage of the bandwidth occupied by the network applications of the second category to the total network bandwidth;

obtaining a gradient range of a percentage of the bandwidth occupied by network applications of the second category to the total bandwidth, and taking a maximum value of the gradient range as the bandwidth estimation.

* * * * *